United States Patent [19]

Nakade

[11] Patent Number: 4,526,375

[45] Date of Patent: Jul. 2, 1985

[54] GOLF BALL

[75] Inventor: Shinichi Nakade, Itami, Japan

[73] Assignee: Sumitomo Rubber Industries, Ltd., Kobe, Japan

[21] Appl. No.: 572,472

[22] Filed: Jan. 20, 1984

[30] Foreign Application Priority Data

Jan. 22, 1983 [JP] Japan ................................ 58-9217

[51] Int. Cl.³ .................... A63B 37/02; A63B 37/12
[52] U.S. Cl. .................... 273/235 R; 260/998.14; 273/218; 524/432; 524/433; 524/521; 524/908; 525/201; 525/221
[58] Field of Search ............... 524/908, 432, 433, 521; 273/218, 220, 235 R, 232, 224; 525/201, 221; 260/998.14

[56] References Cited

U.S. PATENT DOCUMENTS

| | | | |
|---|---|---|---|
| 3,819,768 | 6/1974 | Militor | 525/201 |
| 3,965,055 | 6/1976 | Schichman et al. | 525/211 |
| 4,065,537 | 12/1977 | Miller et al. | 524/432 |
| 4,076,255 | 2/1978 | Moore et al. | 524/423 |
| 4,082,288 | 4/1978 | Martin et al. | 260/998.14 |
| 4,169,599 | 10/1979 | Fujio et al. | 260/998.14 |
| 4,264,075 | 8/1981 | Miller et al. | 524/432 |
| 4,266,772 | 5/1981 | Martin et al. | 260/998.14 |
| 4,274,637 | 6/1981 | Molitor | 521/144 |
| 4,323,247 | 4/1982 | Keches et al. | 525/221 |
| 4,337,947 | 7/1982 | Saito et al. | 525/176 |

FOREIGN PATENT DOCUMENTS 1386382  2/1973  United Kingdom .

*Primary Examiner*—Herbert J. Lilling
*Attorney, Agent, or Firm*—Armstrong, Nikaido, Marmelstein & Kubovcik

[57] ABSTRACT

A golf ball having an improved low temperature impact resistance, which comprises a core and a cover made of a cover composition containing an ionic copolymer having at least two different metal ions in one molecule. The cover composition is prepared by kneading a sodium ion type ionic copolymer having free carboxyl groups and a metal oxide such as magnesium or zinc oxide at high temperatures, whereby the metal oxide is reacted with the ionic copolymer to incorporate the metal ion such as magnesium or zinc ion into the ionic copolymer.

5 Claims, No Drawings

GOLF BALL

BACKGROUND OF THE INVENTION

The present invention relates to a golf ball having an excellent low temperature impact resistance.

Golf balls using ionomer resins in the cover have excellent cut resistance, durability and flight characteristics as compared with golf balls using a balata cover, and have established the status as golf balls of first-class make for several years.

The ionomer resins sold under the trademark "Surlyn" by the E. I. DuPond de Nemours Company are generally employed as cover materials of golf balls. These resins are ionic copolymers of ethylene and a metal salt of an unsaturated carboxylic acid, and there are various grades of polymers such as the sodium ion type and the zinc ion type.

Golf balls using an ionomer resin of a single ion type as a cover material have the drawback of cracking when struck by a golf club at low temperatures. In order to eliminate to this drawback, it is proposed to employ as a cover material a mixture of at least two different ionomer resins, e.g. a mixture of a sodium ion type ionomer resin and a zinc ion type ionomer resin. However, the proposed cover composition has the disadvantages that the fatigue fracture of the golf ball due to repeated impacts is hastened and also the degree of freedom in designing the cover characteristics is lowered because the kinds of the resins to be blended are restricted.

It is an object of the present invention to provide a golf ball having an excellent low temperature impact resistance.

A further object of the invention is to provide a golf ball having an excellent low temperature impact resistance as well as other properties by a simple method as compared with a conventional golf ball using a mixture of different ionomer resins as a cover material.

These and other objects of the present invention will become apparent from the description hereinafter.

SUMMARY OF THE INVENTION

In accordance with the present invention, there is provided a golf ball comprising a core and a cover, said cover being made of a cover composition prepared by kneading a composition comprising an ionic copolymer of units of ethylene and units of an unsaturated monocarboxylic acid, a part of the unsaturated monocarboxylic acid units being in the form of sodium salts, and 0.1 to 3.0 parts by weight of a metal oxide per 100 parts by weight of said ionic copolymer at a temperature of 120° to 250° C. to react the ionic copolymer with the metal oxide.

DETAILED DESCRIPTION

Ionic copolymers of ethylene and an unsaturated monocarboxylic acid, preferably acrylic acid and/or methacrylic acid, a part of the unsaturated monocarboxylic acid units being in the form of a sodium salt, are employed in the present invention. The content of the carboxylic acid units in the copolymers can be varied, but it is desirable that the content of the carboxylic acid units is from 8 to 20% by weight, especially 10 to 15% by weight. It is necessary that the ionic copolymers have free carboxyl groups, and it is preferable that 40 to 80%, preferably 45 to 75%, of the carboxylic acid units is in the form of free acid and the residue is in the form of sodium salt. Typical examples of the ionic copolymers used in the present invention are, for instance, a random copolymer of ethylene and 10% by weight of methacrylic acid which has a melt flow index of 1.6 and of which 54% of the carboxyl groups is in the form of sodium salt, a random copolymer of ethylene and 11% by weight of methacrylic acid which has a melt flow index of 10 and of which 37% of the carboxyl groups is in the form of sodium salt, and a random copolymer of ethylene and 15% by weight of methacrylic acid which has a melt flow index of 2.8 and of which 29% of the carboxyl groups is in the form of sodium salt.

Representative examples of the metal oxide used in the present invention are, for instance, magnesium oxide and zinc oxide. Magnesium oxide is the most preferable, because of its high reactivity with the ionic copolymer. The metal oxide is employed in an amount of 0.1 to 3.0 parts by weight per 100 parts by weight of the ionic copolymer. It is also preferable to use a mixture of two kinds of metal oxides, e.g. a mixture of magnesium oxide and zinc oxide, in a total amount of 0.1 to 3.0 parts by weight per 100 parts by weight of the ionic copolymer. When the amount of the metal oxide is less than the above range, a sufficient effect on improvement in low temperature impact resistance is not obtained. Also, even if the metal oxide is employed in an amount over the above range, no further improvement in low temperature impact resistance is obtained and it rather brings undersirable phenomena such that the fatigue fracture due to repeated impacts is hastened and also the cut resistance is lowered.

The composition of the present invention used for forming a cover of a golf ball may contain a filler such as titanium dioxide or barium sulfate. Other additives such as coloring agents and antioxidants may also be incorporated in the composition.

The cover composition is prepared by kneading a composition containing the ionic copolymer of the sodium ion type and a metal oxide at a temperature of 120° to 250° C. by means of a mixer, kneader or the like, e.g. an internal mixer, a roll mill or a screw extruder. The kneading is carried out usually for 1 to 30 minutes. By kneading the ionic copolymer of sodium ion type and the metal oxide at such high temperatures, the metal oxide reacts with the sodium ion type copolymer, thus a metal ion such as magnesium ion or zinc ion is incorporated into the copolymer to produce an ionomer resin containing different kinds of metal ions in one polymer molecule.

The cover composition of the present invention can be applied to both of the wound type core and the solid type core in a usual manner.

The present invention is more specifically described and explained by means of the following Examples, in which all parts and % are by weight unless otherwise noted.

It is to be understood that the present invention is not limited to the Examples, and various changes and modifications may be made in the invention without departing from the spirit and scope thereof.

EXAMPLES 1 TO 6 AND COMPARATIVE EXAMPLES 1 TO 3

Cover compositions shown in Table 1 were prepared by kneading the ingredients in an internal mixer at a temperature of 120° to 150° C. for 15 minutes. The composition Nos. 11, 12 and 13 are for comparison.

In Table 1, ionomer resin A is a random copolymer of ethylene and 10% of methacrylic acid which has a melt flow index of 1.6 and of which 54% of the carboxyl groups is in the form of sodium salt. Ionomer resin B is a random copolymer of ethylene and 11% of methacrylic acid which has a melt flow index of 10 and of which 37% of the carboxyl groups is in the form of sodium salt. Ionomer resin C is a random copolymer of ethylene and 15% of methacrylic acid which has a melt flow index of 2.8 and of which 29% of the carboxyl groups is in the form of sodium salt. Ionomer resin D is a random copolymer of ethylene and 11% of methacrylic acid which has a melt flow index of 5 and of which 57% of the carboxyl groups is in the form of zinc salt.

TABLE 1

| Composition No. | 1 | 2 | 3 | 4 | 5 | 6 | 11 | 12 | 13 |
| --- | --- | --- | --- | --- | --- | --- | --- | --- | --- |
| Ingredients (part) | | | | | | | | | |
| Ionomer resin A | 100 | — | — | 100 | 100 | 100 | 100 | — | 50 |
| Ionomer resin B | — | 100 | — | — | — | — | — | — | — |
| Ionomer resin C | — | — | 100 | — | — | — | — | 100 | — |
| Ionomer resin D | — | — | — | — | — | — | — | — | 50 |
| Magnesium oxide | 0.5 | 0.5 | 0.5 | 1.0 | 2.5 | — | — | — | — |
| Zinc oxide | — | — | — | — | — | 1.5 | — | — | — |
| Titanium dioxide | 2.0 | 2.0 | 2.0 | 1.5 | 0 | 1.0 | 2.5 | 2.5 | 2.5 |

The cover commposition in the form of a sheet were cut, and half shells were prepared from the cut specimens by injection molding at an injection pressure of 1,200 kg./cm.$^2$, an injection temperature of 210° to 240° C. and a mold clamping force of 10 ton per one half shell.

A pair of half shells obtained from each of the composition Nos. 1, 2, 4, 5, 6, 11 and 13 were positioned around a standard wound core for golf ball and subjected to compression molding in a usual manner to give a small-sized wound golf ball (diameter of ball: not less than 41.148 mm.). Also, a pair of half shells obtained from each of the composition Nos. 3 and 12 were positioned around a standard solid core for golf ball and subjected to compression molding in a usual manner to give a small-sized two piece solid golf ball.

The obtained golf balls were subjected to a test of low temperature impact resistance. Six balls were cooled to the prescribed temperature (−10° C., −20° C. or −30° C.) and each ball was propelled out of a compressed air gun at a velocity of 45 m./second to allow to strike a steel plate 10 times. The balls were again cooled to the prescribed temperature and allowed to strike the steel plate 10 times. This procedure was repeated 5 times total, and the number of undamaged balls was counted.

The results are shown in Table 2.

TABLE 2

| | Ex. 1 | Ex. 2 | Ex. 3 | Ex. 4 | Ex. 5 | Ex. 6 | Com. Ex. 1 | Com. Ex. 2 | Com. Ex. 3 |
| --- | --- | --- | --- | --- | --- | --- | --- | --- | --- |
| Cover composition No. | 1 | 2 | 3 | 4 | 5 | 6 | 11 | 12 | 13 |
| Kind of core* | W | W | S | W | W | W | W | S | W |
| The number of undamaged balls | | | | | | | | | |
| at −10° C. | 6 | 6 | 6 | 6 | 6 | 6 | 5 | 4 | 6 |
| at −20° C. | 6 | 6 | 6 | 6 | 6 | 6 | 0 | 1 | 5 |
| at −30° C. | 5 | 4 | 6 | 5 | 6 | 5 | 0 | 0 | 0 |

*"W" shows a wound core, and "S" shows a solid core.

It is observed in Table 2 that the golf balls of the present invention are superior in low temperature impact resistance to conventional golf balls using a single ionomer resin as a cover material (Comparative Examples 1 and 2) and a conventional golf ball using a mixture of a sodium ion type ionomer resin and a zinc ion type ionomer resin as a cover material (Comparative Example 3).

In addition to the ingredients used in the Examples, other ingredients can be used in the Examples as set forth in the specification to obtain substantially the same results.

What is claimed is:

1. A golf ball consisting essentially of a core and a cover, said cover being made of a cover composition prepared by kneading a composition comprising an ionic copolymer of units of ethylene and units of an unsaturated monocarboxylic acid, a part of the unsaturated monocarboxylic acid units being in the form of sodium salt, and 0.1 to 3.0 parts by weight of a metal oxide per 100 parts by weight of said ionic copolymer at a temperature of 120° to 250° C. to react the ionic copolymer with the metal oxide, wherein the metal oxide is at least one member selected from the group consisting of magnesium oxide and zinc oxide.

2. A golf ball of claim 1, wherein the unsaturated monocarboxylic acid is methacrylic acid.

3. The golf ball of claim 1, wherein the metal oxide is magnesium oxide.

4. The gold ball of claim 1, wherein prior to kneading the content of the carboxylic acid units in the copolymer is from 8 to 20% by weight, 40 to 80% of the carboxylic acid units being in the form of free acid and the residue being in the form of sodium salt.

5. A process for preparing a golf ball comprising a core and a cover and having an improved low temperature impact resistance, which comprises kneading a cover composition containing an ionic copolymer of ethylene and an unsaturated monocarboxylic acid, a part of the unsaturated monocarboxylic acid component being in the form of sodium salt, and 0.1 to 3.0 parts by weight of a metal oxide selected from the group consisting of magnesium oxide and zinc oxide per 100 parts by weight of said ionic copolymer at a temperature of 120° to 250° to incorporate the metal ion corresponding to the metal oxide into said ionic copolymer, and covering a core with said cover composition.

* * * * *

UNITED STATES PATENT AND TRADEMARK OFFICE
CERTIFICATE OF CORRECTION

PATENT NO.   : 4,526,375
DATED        : July 2, 1985
INVENTOR(S)  : SHINICHI NAKADE It is certified that error appears in the above-identified patent and that said Letters Patent is hereby corrected as shown below:

Column 1, line 13, change "DuPond" to --- DuPont ---.

Column 4, line 37, change "gold" to --- golf ---.

Signed and Sealed this

Fifteenth Day of October 1985

[SEAL]

Attest:

DONALD J. QUIGG

Attesting Officer

Commissioner of Patents and
Trademarks—Designate